United States Patent [19]
Usui et al.

[11] 3,788,669
[45] Jan. 29, 1974

[54] SAFETY DEVICE FOR MOTOR VEHICLE

[75] Inventors: Keizauburo Usui, Yokosuka; Michio Yamaguchi, Yokohama, both of Japan

[73] Assignee: Nissan Motor Company, Limited, Yokohama, Japan

[22] Filed: July 27, 1971

[21] Appl. No.: 166,411

[30] Foreign Application Priority Data
Sept. 8, 1970 Japan............................45-78727
Sept. 8, 1970 Japan............................45-89333

[52] U.S. Cl. ................ 280/150 AB, 137/67, 222/3
[51] Int. Cl. ............................................ B60r 21/08
[58] Field of Search...280/150 AB; 137/67, 68; 222/3; 169/28

[56] References Cited
UNITED STATES PATENTS

| | | | |
|---|---|---|---|
| 764,763 | 4/1904 | Pierce | 169/28 |
| 1,982,514 | 11/1934 | Hansen | 137/68 |
| 3,117,424 | 1/1964 | Hebenstreit | 222/3 |
| 3,191,533 | 6/1965 | Hopson | 137/68 X |
| 3,515,217 | 6/1970 | Jamison | 169/28 X |
| 3,528,681 | 9/1970 | Ekstrom | 280/150 AB |
| 3,567,245 | 3/1971 | Ekstrom | 280/150 AB |
| 3,670,925 | 6/1972 | Moyant | 222/3 |
| 3,642,304 | 2/1972 | Johnson | 280/150 AB |
| 3,602,527 | 8/1971 | Goetz | 280/150 AB |
| 3,600,003 | 8/1971 | Carey | 280/150 AB |
| 3,196,610 | 7/1965 | Anderson | 137/68 X |
| 3,680,886 | 8/1972 | Mazelsky | 280/150 AB |

*Primary Examiner*—David Schonberg
*Assistant Examiner*—John P. Silverstrim
*Attorney, Agent, or Firm*—Robert E. Burns; Emmanuel J. Lobato

[57] ABSTRACT

A safety device for a motor vehicle adapted to protect a vehicle occupant from injury in the event of a collision of the motor vehicle, comprising pressurized gas supply unit including a pressurized gas generating means and a sealing means in clsoing engagement with a discharge outlet portion of the pressurized gas generating means. The sealing means includes a unitary casing having a closed end portion and an open end portion and detonating means mounted at the closed end portion of the casing for rupturing, when activated, the casing thereby to provide communication between the outlet portion and the inflatable confinement whereby the pressurized gas is admitted to the inflatable confinement to actuate the same to its protective position.

7 Claims, 3 Drawing Figures

PATENTED JAN 29 1974

SAFETY DEVICE FOR MOTOR VEHICLE

This invention relates to a safety device for a motor vehicle and, more particularly, to a safety device for protecting a vehicle occupant from injury during a collision of the vehicle with an obstruction.

A known safety device used in a motor vehicle usually includes an inflatable confinement or protector bag which is normally held in a collapsed or folded position. The confinement is located between the vehicle occupant and structural parts of the vehicle such as a windshield, an instrument panel and a steering wheel whereby, when the confinement is inflated as a result of an impact or collision of the motor vehicle, the vehicle occupant is prevented from contacting the structural parts of the vehicle.

In order that the safety device operates reliably, it is desired that the inflatable confinement be expanded and projected to its protective position as fast as possible when a collision is encountered by the motor vehicle. Improvements have heretofore been made on the safety device for instantaneously detecting an impact encountered by the motor vehicle and for causing the inflatable confinement to assume the protective position as rapidly as possible.

The inflatable confinement is actuated to its expanded position with a pressurized gas which is supplied from an appropriate pressurized gas supply unit. This unit includes a normally closed pressurized gas generator adapted to produce the pressurized gas when opened and a suitable sealing means normally closing the pressurized gas generator. The sealing means is associated with an impact-responsive triggering means which is actuated in response to the collision of the motor vehicle. The sealing means is released from the pressurized gas generator when the triggering means is actuated, allowing the pressurized gas into the collapsed inflatable confinement. This invention is thus directed generally to the arranged pressurized gas supply unit and more particularly to the sealing means of this particular unit.

It is, therefore, an object of this invention to provide an improved pressurized gas supply unit for use in a safety device, in which sealing means is simple in construction and easy to manufacture and assemble.

Another object of this invention is to provide a pressurized gas supply unit which is suited for a large-sized production on a commercial basis and accordingly for curtailing the production cost of the safety device.

Still another object of this invention is to provide a pressurized gas supply unit by which the pressurized gas is immediately supplied to the inflatable confinement when the triggering means is actuated during a collision of a motor vehicle.

Still another object of this invention is to provide a pressurized gas supply unit having protector means for preventing shell fragments of the sealing means from entering the inflatable confinement whereby the safety device operates reliably.

In general, these and other objects and features of this invention may be attained in a pressurized gas supply unit which includes a pressurized gas generator having an outlet portion through communication is established with the inflatable confinement when a gas generator is opened, and a rupturable sealing means in closing engagement with the outlet portion of the pressurized gas generator. The sealing means includes a unitary bottom casing which has a closed end portion and an open end portion and which is tightly fitted to the outlet portion of the gas generator to temporarily close the gas generator. At the closed end portion of the casing is positioned a detonating means, which has a circumferential weaked portion formed in its periphery and an explosive means received in the weaked portion for rupturing the casing into pieces, when activated, in response to an impact resulting from a collision of the motor vehicle and consequently providing communication between the outlet portion of the gas generator and the inflatable confinement. The pressurized gas supply unit further includes a housing means having a plurality of apertures communicating with the inflatable confinement and which is mounted on the outlet portion of the gas generator to enclose the sealing means for thereby preventing shell fragments thereof from entering the inflatable confinement.

Figure 1:
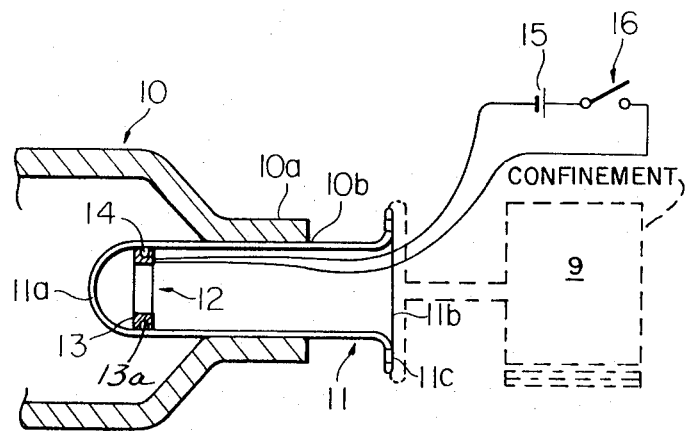
FIG. 1 is a sectional view of a preferred embodiment of the pressurized gas supply unit according to this invention.
Figure 2:
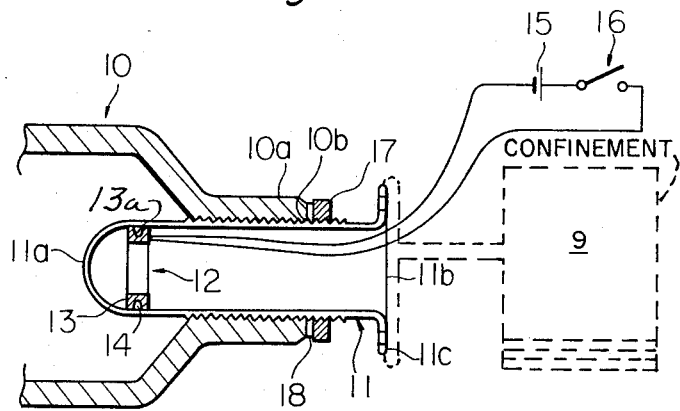
FIG. 2 is a sectional view showing a modified form of the pressurized gas supply unit shown in FIG. 1.

Referring now to the drawings and more particularly to FIGS. 1 and 2, a preferred embodiment of the pressurized gas supply unit implementing this invention is schematically shown, which includes a pressurized gas generating means such as a container 10, partially shown in section, which may be constructed and arranged in any desired manner. The container may, for instance, contain a gas under pressure or a liquefied gas which is ready for conversion into a gas under pressure. Or otherwise, the container 10 may contain an explosive which is adapted to produce a gas under pressure when activated or blown up by suitable means. As shown, the constainer 10 has a neck portion 10a to form a pressurized gas discharge outlet opening 10b. The pressurized gas supply unit also includes a sealing means which is in closing engagement with the pressurized gas pressurized gas outlet opening 10b. The sealing means includes a unitary casing 11 and a detonating means 12.

The unitary casing 11 has a closed end portion 11a integrally formed therewith and an open end portion 11b. In the embodiment illustrated in FIGS. 1 and 2, the closed end portion 11a of the unitary casing 11 is shown to be inserted into the neck portion 10a of the container 10. The unitary casing 11 may be tightly fitted to the neck portion 10a by welding (FIG. 1) or by screwing (FIG. 2). The unitary casing 11 is connected to a hollow housing or a diffuser tube (not shown) which communicates with an inflatable confinement 9. A flange 11c may be provided at the outer end of the casing 11 for rigid connection with such hollow housing or diffuser tube.

Figure 3:
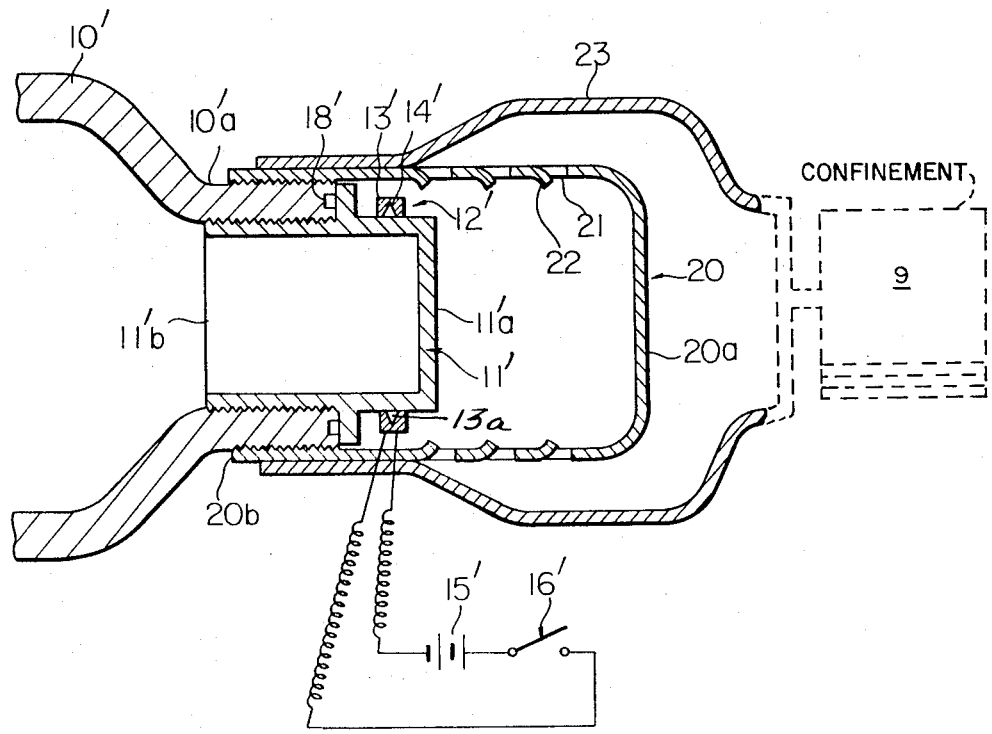
FIG. 3 is a sectional view of another preferred embodiment of the pressurized gas supply unit.

The rupturing or detonating means 12 is positioned adjacent the closed end portion 11a of the unitary casing 11 extending into the interior of the container 10. The detonating means 12 is shown in FIGS. 1 and 2 to be mounted on the inner peripheral wall of the casing 11, but may be mounted on the outer peripheral wall of the casing 11 as seen in FIG. 3. The detonating means 12 includes an apertured support 13 mounted at the close end portion of the casing 11 and having in its outer periphery formed a substantially U-shaped (FIG.

1) or V-shaped (FIG. 2) annular groove 13a which forms a weakened portion. The detonating means 12 is loaded in this annular groove 13a with a suitable explosive 14 so that, when it is activated, the casing 11 is broken at its closed end portion 11a. It will be appreciated that the specific configuration of the peripheral groove receiving the explosive 14 therein will contribute to enhancing the blowing effect due to the so-called hollow-charge principle (or Munroe or Neumann effect).

The detonating means 12 thus constructed is electrically connected through a source 15 of electric power to triggering means 16 which is responsive to an impact between the vehicle and an obstruction and which is actuated when such impact is sensed by the switch means.

Designated by reference numeral 17 in FIG. 2 is a locking nut which may be provided to secure the casing 11 to the container 10 where the casing 11 is screwed to the neck portion 10a of the container 10. In this instance, a packing 18 may be interposed between the neck portion 10a and the locking nut 17, as illustrated.

When, in operation, the switch means 16 is closed in response to an operating condition of the vehicle at the initial stage of a collision, then the circuit connecting the triggering means 16 and the source 15 of electric power is completed and, as a consequence, the detonating means 12 is actuated to cause its explosive 14 to be fired. The closed end portion 11a of the casing 11 is immediately severed from the remaining part of the casing, providing communication between the container 10 and the casing 11. The portion 11a can be blown off forcefully and instantaneously due to the hollow-charge principle resulting from the U- or V-shaped outer peripheral groove receiving the explosive 14 therein, as previously discussed.

The blow-up of the closed end portion 11a is followed by a momentary expansion of the pressurized fluid contained in the container 10 and the pressurized fluid is thus permitted to rapidly flow into the inflatable confinement 9 through the outlet opening 11b of the casing and the hollow housing or diffuser tube (not shown) interconnecting the casing 11 and the confinement. The confinement is expanded and thrown between the vehicle occupant and the structural parts of the vehicle.

Another embodiment of the unit is schematically illustrated in FIG. 3, wherein like component parts are designated by same numerals corresponding to those used in FIGS. 1 and 2 except that a prime (') has been added to those, respectively. In this embodiment the construction is substantially similar to that described with reference to FIGS. 1 and 2, except that a housing means 20 is mounted on the neck portion 10'a of the container 10' so that the unitary casing 11' is enclosed therein (the casing 11' being herein shown to be screwed into the neck portion 10'a so that the open end portion 11'b extends into the interior of the container 10'). As shown in FIG. 3, the shielding member or housing means 20 has a closed end portion 20a and an open end portion 20b. The housing means 20 is provided at its periphery a plurality of apertures 21 and projections 22 which prevent shell fragments of the casing 11' from entering the inflatable confinement 9' so that the safety device will operate reliably. The hollow housing, designated at 23, is mounted on the neck portion 10'a of the container 10' so as to enclose the housing means 20 and communicated with the inflatable confinement 9'.

It will now be understood from foregoing description that, since the pressurized gas supply unit according to this invention is simply made up of a unitary bottomed casing fitted to the outlet portion of a pressurized gas generating means and a detonating means mounted adjacent the closed end portion of the casing, the pressurized supply unit features simplified construction and easy assembling procedure and yet provides satisfactory responsiveness to a collision and satisfactory performance reliability. The simplified construction of the pressurized gas supply unit herein disclosed will prove advantageous for the purpose of reducing the number of components and parts of the automotive safety devices of the described type.

What is claimed is:

1. In a motor vehicle collision safety device having an inflatable confinement for protecting a vehicle occupant and means for supplying pressurized gas for inflating the inflatable confinement, said means including a discharge outlet and a fluid communication path providing communication between said discharge outlet and said inflatable confinement: rupturable sealing means for sealing said discharge outlet until ruptured comprising a rupturable unitary casing disposed in said fluid communication path and having a closed end portion blocking fluid communication until ruptured and an open end portion; and rupturing means disposed at said closed end portion for rupturing said casing along a circumferential portion thereof to unblock said fluid communication path to permit pressurized gas to inflate said inflatable confinement, said rupturing means comprising an explosive charge disposed on said circumferential portion of said casing.

2. In a motor vehicle collision safety device according to claim 1, further comprising a shielding member enclosing said sealing means and having means therein defining a plurality of apertures and having a plurality of means for preventing casing fragments formed during the rupturing of said casing from passing through said apertures.

3. In a motor vehicle collision safety device according to claim 1 wherein said rupturing means is disposed externally circumferenttially on said casing.

4. In a motor vehicle collision safety device according to claim 1, wherein said rupturing means is disposed internally circumferentially in said casing.

5. In a motor vehicle collision safety device according to claim 1, wherein said rupturing means has means therein defining an annular groove extending along the circumference of said casing and receiving therein said explosive charge.

6. In a motor vehicle collision safety device according to claim 5, wherein said means defining an annular groove comprises a groove having a U-shaped cross-section.

7. In a motor vehicle collision safety device according to claim 5, wherein said means defining an annular groove comprises a groove having a V-shaped cross-section.

* * * * *